United States Patent
Cohen et al.

(10) Patent No.: US 11,016,677 B2
(45) Date of Patent: *May 25, 2021

(54) DUAL-SPLITTER FOR HIGH PERFORMANCE REPLICATION

(71) Applicant: EMC IP Holding Company LLC, Hopkinton, MA (US)

(72) Inventors: Saar Cohen, Moshav Mishmeret (IL); Assaf Natanzon, Tel Aviv (IL); Kirill Shoikhet, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 141 days.

This patent is subject to a terminal disclaimer.

(21) Appl. No.: 16/367,630

(22) Filed: Mar. 28, 2019

(65) Prior Publication Data

US 2019/0227723 A1 Jul. 25, 2019

Related U.S. Application Data

(62) Division of application No. 15/377,112, filed on Dec. 13, 2016, now Pat. No. 10,324,637.

(51) Int. Cl.
*G06F 12/00* (2006.01)
*G06F 3/06* (2006.01)
(Continued)

(52) U.S. Cl.
CPC .......... *G06F 3/0619* (2013.01); *G06F 3/0665* (2013.01); *G06F 3/0689* (2013.01);
(Continued)

(58) Field of Classification Search
CPC ........ G06F 12/00; G06F 3/06; G06F 11/1446; G06F 13/00; G06F 3/0619; G06F 3/0655; G06F 3/0689
(Continued)

(56) References Cited

U.S. PATENT DOCUMENTS 7,203,741 B2  4/2007  Marco et al.
7,719,443 B1  5/2010  Natanzon
(Continued)

OTHER PUBLICATIONS

U.S. Appl. No. 16/046,763, filed Jul. 30, 2018, Schneider et al.
(Continued)

*Primary Examiner* — Tuan V Thai
(74) *Attorney, Agent, or Firm* — Daly, Crowley, Mofford & Durkee, LLP

(57) ABSTRACT

An aspect of performing dual splitting functions in a data replication system include receiving an I/O from a host computer. The host computer includes a first splitter configured to perform control path functions. An aspect also includes adding, via the first splitter, metadata for the I/O to a backlog at the host computer, and sending the I/O to a storage array. The storage array includes a second splitter configured to perform data path functions. An aspect further includes receiving, by the storage array, the I/O from the host computer, and sending, via the second splitter, the I/O to at least one storage device of the storage array and to a data protection appliance (DPA). The control path functions include tracking I/Os and maintaining backlogs including the backlog at the host computer, and the data path functions include mirroring operations in the storage array.

14 Claims, 7 Drawing Sheets

(51) Int. Cl.
*G06F 9/455* (2018.01)
*G06F 13/00* (2006.01)

(52) U.S. Cl.
CPC .............. *G06F 9/45558* (2013.01); *G06F 2009/45579* (2013.01); *G06F 2009/45583* (2013.01)

(58) Field of Classification Search
USPC .............................. 711/100, 114, 154, 200
See application file for complete search history.

(56) References Cited

U.S. PATENT DOCUMENTS

| | | | |
|---|---|---|---|
| 7,840,536 B1 | 11/2010 | Ahal et al. | |
| 7,840,662 B1 | 11/2010 | Natanzon | |
| 7,844,856 B1 | 11/2010 | Ahal et al. | |
| 7,860,836 B1 | 12/2010 | Natanzon et al. | |
| 7,882,286 B1 | 2/2011 | Natanzon et al. | |
| 7,925,749 B1* | 4/2011 | Lin .................... | G06F 16/119 709/225 |
| 7,934,262 B1 | 4/2011 | Natanzon et al. | |
| 7,958,372 B1 | 6/2011 | Natanzon | |
| 8,037,162 B2 | 10/2011 | Marco et al. | |
| 8,041,940 B1 | 10/2011 | Natanzon et al. | |
| 8,060,713 B1 | 11/2011 | Natanzon | |
| 8,060,714 B1 | 11/2011 | Natanzon | |
| 8,103,937 B1 | 1/2012 | Natanzon et al. | |
| 8,108,634 B1 | 1/2012 | Natanzon et al. | |
| 8,214,612 B1 | 7/2012 | Natanzon | |
| 8,250,149 B2 | 8/2012 | Marco et al. | |
| 8,271,441 B1 | 9/2012 | Natanzon et al. | |
| 8,271,447 B1 | 9/2012 | Natanzon et al. | |
| 8,332,687 B1 | 12/2012 | Natanzon et al. | |
| 8,335,761 B1 | 12/2012 | Natanzon | |
| 8,335,771 B1 | 12/2012 | Natanzon et al. | |
| 8,341,115 B1 | 12/2012 | Natanzon et al. | |
| 8,370,648 B1 | 2/2013 | Natanzon | |
| 8,380,885 B1 | 2/2013 | Natanzon | |
| 8,392,680 B1 | 3/2013 | Natanzon et al. | |
| 8,429,362 B1 | 4/2013 | Natanzon et al. | |
| 8,433,869 B1 | 4/2013 | Natanzon et al. | |
| 8,438,135 B1 | 5/2013 | Natanzon et al. | |
| 8,464,101 B1 | 6/2013 | Natanzon et al. | |
| 8,478,955 B1 | 7/2013 | Natanzon et al. | |
| 8,495,304 B1 | 7/2013 | Natanzon et al. | |
| 8,510,279 B1 | 8/2013 | Natanzon et al. | |
| 8,521,691 B1 | 8/2013 | Natanzon | |
| 8,521,694 B1 | 9/2013 | Natanzon | |
| 8,543,609 B1 | 9/2013 | Natanzon | |
| 8,583,885 B1 | 11/2013 | Natanzon | |
| 8,600,945 B1 | 12/2013 | Natanzon et al. | |
| 8,601,085 B1 | 12/2013 | Ives et al. | |
| 8,627,012 B1 | 1/2014 | Derbeko et al. | |
| 8,683,592 B1 | 3/2014 | Dotan et al. | |
| 8,694,700 B1 | 4/2014 | Natanzon et al. | |
| 8,706,700 B1 | 4/2014 | Natanzon et al. | |
| 8,712,962 B1 | 4/2014 | Natanzon et al. | |
| 8,719,497 B1 | 5/2014 | Don et al. | |
| 8,725,691 B1 | 5/2014 | Natanzon | |
| 8,725,692 B1 | 5/2014 | Natanzon et al. | |
| 8,726,066 B1 | 5/2014 | Natanzon et al. | |
| 8,738,813 B1 | 5/2014 | Natanzon et al. | |
| 8,745,004 B1 | 6/2014 | Natanzon et al. | |
| 8,751,828 B1 | 6/2014 | Raizen et al. | |
| 8,769,336 B1 | 7/2014 | Natanzon et al. | |
| 8,805,786 B1 | 8/2014 | Natanzon | |
| 8,806,161 B1 | 8/2014 | Natanzon | |
| 8,825,848 B1 | 9/2014 | Dotan et al. | |
| 8,832,399 B1 | 9/2014 | Natanzon et al. | |
| 8,850,143 B1 | 9/2014 | Natanzon | |
| 8,850,144 B1 | 9/2014 | Natanzon et al. | |
| 8,862,546 B1 | 10/2014 | Natanzon et al. | |
| 8,892,835 B1 | 11/2014 | Natanzon et al. | |
| 8,898,112 B1 | 11/2014 | Natanzon et al. | |
| 8,898,409 B1 | 11/2014 | Natanzon et al. | |
| 8,898,515 B1 | 11/2014 | Natanzon | |
| 8,898,519 B1 | 11/2014 | Natanzon et al. | |
| 8,914,595 B1 | 12/2014 | Natanzon | |
| 8,924,668 B1 | 12/2014 | Natanzon | |
| 8,930,500 B2 | 1/2015 | Marco et al. | |
| 8,930,947 B1 | 1/2015 | Derbeko et al. | |
| 8,935,498 B1 | 1/2015 | Natanzon | |
| 8,949,180 B1 | 2/2015 | Natanzon et al. | |
| 8,954,673 B1 | 2/2015 | Natanzon et al. | |
| 8,954,796 B1 | 2/2015 | Cohen et al. | |
| 8,959,054 B1 | 2/2015 | Natanzon | |
| 8,977,593 B1 | 3/2015 | Natanzon et al. | |
| 8,977,826 B1 | 3/2015 | Meiri et al. | |
| 8,996,460 B1 | 3/2015 | Frank et al. | |
| 8,996,461 B1 | 3/2015 | Natanzon et al. | |
| 8,996,827 B1 | 3/2015 | Natanzon | |
| 9,003,138 B1 | 4/2015 | Natanzon et al. | |
| 9,026,696 B1 | 5/2015 | Natanzon et al. | |
| 9,031,913 B1 | 5/2015 | Natanzon | |
| 9,032,160 B1 | 5/2015 | Natanzon et al. | |
| 9,037,818 B1 | 5/2015 | Natanzon et al. | |
| 9,063,994 B1 | 6/2015 | Natanzon et al. | |
| 9,069,479 B1 | 6/2015 | Natanzon | |
| 9,069,709 B1 | 6/2015 | Natanzon et al. | |
| 9,081,754 B1 | 7/2015 | Natanzon et al. | |
| 9,081,842 B1 | 7/2015 | Natanzon et al. | |
| 9,087,008 B1 | 7/2015 | Natanzon | |
| 9,087,112 B1 | 7/2015 | Natanzon et al. | |
| 9,104,529 B1 | 8/2015 | Derbeko et al. | |
| 9,110,914 B1 | 8/2015 | Frank et al. | |
| 9,116,811 B1 | 8/2015 | Derbeko et al. | |
| 9,128,628 B1 | 9/2015 | Natanzon et al. | |
| 9,128,855 B1 | 9/2015 | Natanzon et al. | |
| 9,134,914 B1 | 9/2015 | Derbeko et al. | |
| 9,135,119 B1 | 9/2015 | Natanzon et al. | |
| 9,135,120 B1 | 9/2015 | Natanzon | |
| 9,146,878 B1 | 9/2015 | Cohen et al. | |
| 9,152,339 B1 | 10/2015 | Cohen et al. | |
| 9,152,578 B1 | 10/2015 | Saad et al. | |
| 9,152,814 B1 | 10/2015 | Natanzon | |
| 9,158,578 B1 | 10/2015 | Derbeko et al. | |
| 9,158,630 B1 | 10/2015 | Natanzon | |
| 9,160,526 B1 | 10/2015 | Raizen et al. | |
| 9,177,670 B1 | 11/2015 | Derbeko et al. | |
| 9,189,339 B1 | 11/2015 | Cohen et al. | |
| 9,189,341 B1 | 11/2015 | Natanzon et al. | |
| 9,201,736 B1 | 12/2015 | Moore et al. | |
| 9,223,659 B1 | 12/2015 | Natanzon et al. | |
| 9,225,529 B1 | 12/2015 | Natanzon et al. | |
| 9,235,481 B1 | 1/2016 | Natanzon et al. | |
| 9,235,524 B1 | 1/2016 | Derbeko et al. | |
| 9,235,632 B1 | 1/2016 | Natanzon | |
| 9,244,997 B1 | 1/2016 | Natenzon et al. | |
| 9,256,605 B1 | 2/2016 | Natanzon | |
| 9,274,718 B1 | 3/2016 | Natanzon et al. | |
| 9,275,063 B1 | 3/2016 | Natanzon | |
| 9,286,052 B1 | 3/2016 | Solan et al. | |
| 9,305,009 B1 | 4/2016 | Bono et al. | |
| 9,323,750 B2 | 4/2016 | Natanzon et al. | |
| 9,330,155 B1 | 5/2016 | Bono et al. | |
| 9,336,094 B1 | 5/2016 | Wolfson et al. | |
| 9,336,230 B1 | 5/2016 | Natanzon | |
| 9,367,260 B1 | 6/2016 | Natanzon | |
| 9,378,096 B1 | 6/2016 | Erel et al. | |
| 9,378,219 B1 | 6/2016 | Bono et al. | |
| 9,378,261 B1 | 6/2016 | Bono et al. | |
| 9,383,937 B1 | 7/2016 | Frank et al. | |
| 9,389,800 B1 | 7/2016 | Natanzon et al. | |
| 9,405,481 B1 | 8/2016 | Cohen et al. | |
| 9,405,684 B1 | 8/2016 | Derbeko et al. | |
| 9,405,765 B1 | 8/2016 | Natanzon | |
| 9,411,535 B1 | 8/2016 | Shemer et al. | |
| 9,459,804 B1 | 10/2016 | Natanzon et al. | |
| 9,460,028 B1 | 10/2016 | Raizen et al. | |
| 9,471,579 B1 | 10/2016 | Natanzon | |
| 9,477,407 B1 | 10/2016 | Marshak et al. | |
| 9,501,542 B1 | 11/2016 | Natanzon | |
| 9,507,732 B1 | 11/2016 | Natanzon et al. | |
| 9,507,845 B1 | 11/2016 | Natanzon et al. | |

(56) References Cited

U.S. PATENT DOCUMENTS

| | | |
|---|---|---|
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,720,618 B1 | 11/2017 | Panidis et al. |
| 9,811,431 B1 | 11/2017 | Natanzon et al. |
| 9,823,855 B2 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 10,037,251 B1 | 7/2018 | Bono et al. |
| 10,042,579 B1 | 8/2018 | Natanzon |
| 10,042,751 B1 | 8/2018 | Veprinsky et al. |
| 10,055,146 B1 | 8/2018 | Natanzon et al. |
| 10,055,148 B1 | 8/2018 | Natanzon et al. |
| 10,061,666 B1 | 8/2018 | Natanzon et al. |
| 10,067,694 B1 | 9/2018 | Natanzon et al. |
| 10,067,837 B1 | 9/2018 | Natanzon et al. |
| 10,078,459 B1 | 9/2018 | Natanzon et al. |
| 10,082,980 B1 | 9/2018 | Cohen et al. |
| 10,083,093 B1 | 9/2018 | Natanzon et al. |
| 10,095,489 B1 | 10/2018 | Lieberman et al. |
| 10,101,943 B1 | 10/2018 | Ayzenberg et al. |
| 10,108,356 B1 | 10/2018 | Natanzon et al. |
| 10,108,507 B1 | 10/2018 | Natanzon |
| 10,108,645 B1 | 10/2018 | Bigman et al. |
| 10,114,581 B1 | 10/2018 | Natanzon et al. |
| 10,120,787 B1 | 11/2018 | Shemer et al. |
| 10,120,925 B1 | 11/2018 | Natanzon et al. |
| 10,126,946 B1 | 11/2018 | Natanzon et al. |
| 10,133,874 B1 | 11/2018 | Natanzon et al. |
| 10,140,039 B1 | 11/2018 | Baruch et al. |
| 10,146,436 B1 | 12/2018 | Natanzon et al. |
| 10,146,639 B1 | 12/2018 | Natanzon et al. |
| 10,146,675 B1 | 12/2018 | Shemer et al. |
| 10,146,961 B1 | 12/2018 | Baruch et al. |
| 10,148,751 B1 | 12/2018 | Natanzon |
| 10,152,246 B1 | 12/2018 | Lieberman et al. |
| 10,152,267 B1 | 12/2018 | Ayzenberg et al. |
| 10,152,384 B1 | 12/2018 | Amit et al. |
| 10,157,014 B1 | 12/2018 | Panidis et al. |
| 10,185,583 B1 | 1/2019 | Natanzon et al. |
| 10,191,677 B1 | 1/2019 | Natanzon et al. |
| 10,191,687 B1 | 1/2019 | Baruch et al. |
| 10,191,755 B1 | 1/2019 | Natanzon et al. |
| 10,203,904 B1 | 2/2019 | Natanzon et al. |
| 10,210,073 B1 | 2/2019 | Baruch et al. |
| 10,223,007 B1 | 3/2019 | Natanzon et al. |
| 10,223,023 B1 | 3/2019 | Natanzon et al. |
| 10,223,131 B1 | 3/2019 | Lieberman et al. |
| 10,229,006 B1 | 3/2019 | Natanzon et al. |
| 10,229,056 B1 | 3/2019 | Panidis et al. |
| 2003/0220944 A1* | 11/2003 | Lyman Schottland ............ G06F 8/658 |
| 2008/0082592 A1 | 4/2008 | Ahal et al. |
| 2013/0124668 A1 | 5/2013 | Idziorek et al. |
| 2015/0066847 A1* | 3/2015 | Beard ............... G06F 16/119 707/613 |
| 2016/0124990 A1* | 5/2016 | Suggs ............... G06F 16/1844 707/626 |

OTHER PUBLICATIONS

U.S. Appl. No. 16/050,400, filed Jul. 31, 2018, Alkalay et al.
U.S. Appl. No. 16/052,037, filed Aug. 1, 2018, Schneider et al.
U.S. Appl. No. 15/085,148, filed Mar. 30, 2016, Baruch et al.
U.S. Appl. No. 16/179,295, filed Nov. 2, 2018, Natanzon et al.
U.S. Appl. No. 16/261,174, filed Jan. 29, 2019, Natanzon et el.
U.S. Appl. No. 15/274,362, filed Sep. 23, 2016, Baruch et al.
U.S. Appl. No. 15/275,756, filed Sep. 26, 2016, Natanzon et al.
U.S. Appl. No. 15/275,768, filed Sep. 26, 2016, Natanzon et el.
U.S. Appl. No. 15/377,112, filed Dec. 13, 2016, Cohen, et al.
U.S. Appl. No. 15/379,940, filed Dec. 15, 2016, Baruch et al.
U.S. Appl. No. 15/380,013, filed Dec. 15, 2016, Baruch et al.
U.S. Appl. No. 15/386,754, filed Dec. 21, 2016, Shemer et al.
U.S. Appl. No. 15/390,996, filed Dec. 27, 2016, Natanzon et al.
U.S. Appl. No. 15/391,030, filed Dec. 27, 2016, Shemer et al.
U.S. Appl. No. 14/496,783, filed Sep. 25, 2014, Natanzon et al.
U.S. Appl. No. 14/496,790, filed Sep. 25, 2014, Cohen et al.
U.S. Appl. No. 14/559,036, filed Dec. 3, 2014, Natanzon et al.
U.S. Appl. No. 14/753,389, filed Jun. 29, 2015, Nir et al.
U.S. Appl. No. 15/970,243, filed May 3, 2018, Schneider et al.
U.S. Appl. No. 14/976,719, filed Dec. 21, 2015, Natanzon.
U.S. Appl. No. 14/978,378, filed Dec. 22, 2015, Bigman et al.
Notice of Allowance dated Mar. 6, 2019 for U.S. Appl. No. 15/377,112; 19 pages.
Response to Non Final Office Action filed Nov. 16, 2018 for U.S. Appl. No. 15/377,112; 9 pages.
Non Final Office Action dated Aug. 27, 2018 and filed Dec. 13, 2016 for U.S. Appl. No. 15/377,112; 13 pages.
Response to Restriction Requirement filed Jul. 16, 2015 for U.S. Appl. No. 15/377,112; 1 page.

(56) References Cited

OTHER PUBLICATIONS

Restriction Requirement dated Jul. 12, 2018 for U.S. Appl. No. 15/377,112; 8 pages.
Submission of Formal Drawings filed Jan. 10, 2017 for U.S. Appl. No. 15/377,112; 10 pages.
EMC Corporation, "EMC RECOVERPOINT/EX;" Applied Technology; White Paper; Apr. 2012; 17 Pages.
Non Final Office Action dated Aug. 27, 2018 for U.S. Appl. No. 15/377,112; 13 pages.
Response to Restriction Requirement filed Jul. 16, 2018 for U.S. Appl. No. 15/377,112; 1 page.

* cited by examiner

DUAL-SPLITTER FOR HIGH PERFORMANCE REPLICATION

BACKGROUND

Computer data is vital to today's organizations and a significant part of protection against disasters is focused on data protection. Existing data protection systems may provide continuous data protection, meaning that every change made to data is backed up, as well as snapshots and other types of data protection.

Some existing systems use a so-called "splitter" to send I/O writes to both local storage and to a data protection appliance that performs continuous data protection, snapshotting, etc. It would be desirable to reduce the amount of network traffic and additional latency introduced by a splitter in a data protections system.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for providing dual splitting functions in a data replication system. The method includes receiving an I/O from a host computer. The host computer includes a first splitter configured to perform control path functions. The method also includes adding, via the first splitter, metadata for the I/O to a backlog at the host computer, and sending the I/O to a storage array. The storage array includes a second splitter configured to perform data path functions. The method further includes receiving, by the storage array, the I/O from the host computer, and sending, via the second splitter, the I/O to at least one storage device of the storage array and to a data protection appliance (DPA). The control path functions include tracking I/Os and maintaining backlogs including the backlog at the host computer, and the data path functions include mirroring operations in the storage array.

Another aspect may provide a computer program product embodied on a non-transitory computer readable medium for performing dual splitting functions in a data replication system. The computer program product includes instructions, that when executed by a computer system, causes the computer system to perform operations. The operations include receiving an I/O from a host computer. The host computer includes a first splitter configured to perform control path functions. The operations also include adding, via the first splitter, metadata for the I/O to a backlog at the host computer, and sending the I/O to a storage array. The storage array includes a second splitter configured to perform data path functions. The operations further include receiving, by the storage array, the I/O from the host computer, and sending, via the second splitter, the I/O to at least one storage device of the storage array and to a data protection appliance (DPA). The control path functions include tracking I/Os and maintaining backlogs including the backlog at the host computer, and the data path functions include mirroring operations in the storage array.

BRIEF DESCRIPTION OF THE DRAWINGS

The foregoing features may be more fully understood from the following description of the drawings in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
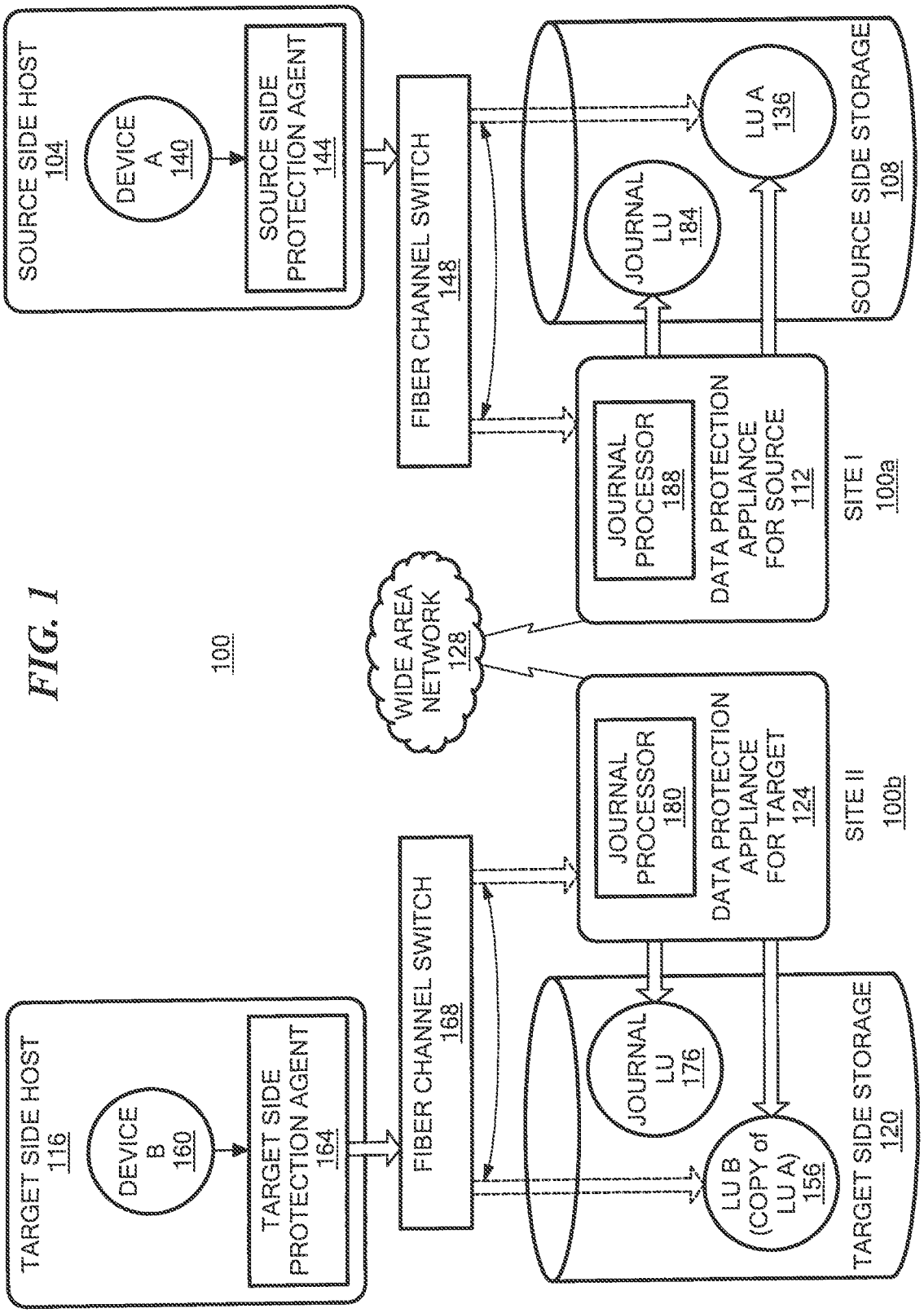
FIG. 1 is a block diagram of a data protection system, according to one embodiment of the disclosure.

Referring to the embodiment of FIG. 1, a data protection system 100 includes two sites: Site I 100*a* and Site II 100*b*. Under normal operation Site I 100*a* may correspond to a source side (i.e., the transmitter within a data replication workflow) of system 100 and Site II 100*b* may be the target side (i.e., the receiver within a data replication workflow) of the system, as shown in FIG. 1. Thus, during normal operations, the direction of replicate data flow may go from Site I 100*a* to Site II 100*b*.

In certain embodiments, Site I and Site II may be remote from one another. In other embodiments, the two sites may be local to one another. In particular embodiments, Site I and Site II may be connected via a local area network (LAN). In other embodiments, the two sites may be connected via a wide area network (WAN), such as the Internet.

In particular embodiments, the data protection system may include a failover mode of operation, wherein the direction of replicated data flow is reversed. In such embodiments, Site I may behave as a target side and Site II may behave as the source side. In some embodiments, failover may be triggered manually (e.g., by a user) or automatically. In many embodiments, failover may be performed in the event of a disaster at Site I. In some embodiments, both Site I and Site II may behave as source side for some stored data and may behave simultaneously as a target site for other stored data. In certain embodiments, a portion of stored data may be replicated from one site to the other, and another portion may not be replicated.

In some embodiments, Site I corresponds to a production site (e.g., a facility where one or more hosts run data processing applications that write data to a storage system and read data from the storage system) and Site II corresponds to a backup or replica site (e.g., a facility where replicated production site data is stored): In such embodiments, Site II may be responsible for replicating production site data and may enable rollback of Site I data to an earlier point in time. In many embodiments, rollback may be used in the event of data corruption of a disaster, or alternatively in order to view or to access data from an earlier point in time.

Referring again to FIG. 1, Site I 100a includes a source host 104, a source storage system (or "storage array") 108, and a source data protection appliance (DPA) 112 coupled via a first storage area network (SAN). Similarly, Site II 100b includes a target host 116, a target storage system 120, and a target DPA 124 coupled via a second SAN. Each SAN may include one or more devices (or "nodes") that may be designated an "initiator," a "target", or both. In the embodiment of FIG. 1, the first SAN includes a first fiber channel switch 148 and the second SAN includes a second fiber channel switch 168. Communication links between each host 104, 116 and its corresponding storage system 108, 120 may be any appropriate medium suitable for data transfer, such as fiber communication channel links. In many embodiments, a host communicates with its corresponding storage system using SCSI commands.

Referring back to FIG. 1, hosts 104 and 116 may each correspond to one computer, a plurality of computers, or a network of distributed computers. In some embodiments, a host may include a processor, volatile memory, non-volatile memory, a data bus, an I/O interface, a display interface and a network interface. In certain embodiments, a host may run at least one data processing application, such as a database application and an e-mail server.

Referring again to FIG. 1, each storage system 108, 120 may include storage devices for storing data, such as disks or arrays of disks. In some embodiments, the storage systems may be target nodes. In certain embodiments, in order to enable initiators to send requests to a storage system, the storage system may expose one or more logical units (LU) to which commands are issued. In many embodiments, the storage systems may be SAN entities that provide multiple LUs for access by multiple SAN initiators. In many embodiments, a LU is a physical or virtual logical entity provided by a storage system for accessing data stored therein. In some embodiments, a LU may be identified by a unique logical unit number (LUN).

In the embodiment of FIG. 1, storage system 108 exposes a logical unit 136, designated as LU A, and storage system 120 exposes a logical unit 156, designated as LU B. LU B may be used for replicating LU A. As such, LU B may be generated as a copy of LU A. In one embodiment, LU B may be configured so that its size is identical to the size of LU A.

Referring back to FIG. 1, the source host 104 generates a host device 140 ("Device A") corresponding to LU A and the source host 116 generates a host device 160 ("Device B") corresponding to LU B. In many embodiments, a host device is a logical entity within a host through which the host may access a LU. In some embodiments, an operating system of a host may generate a host device for each logical unit exposed by a storage system in the host SAN.

Referring again to FIG. 1, the source host 104 is configured to act as a SAN initiator that issues I/O requests through host device 140 to LU 136 ("LU A"). In some embodiments, the I/O requests include SCSI commands. In many embodiments, an I/O request includes an address that includes a specific device identifier, an offset within the device, and a data size.

Referring back to FIG. 1, the source DPA 112 and target DPA 124 may perform various data protection services, such as data replication of a storage system, and journaling of I/O requests issued by the hosts 104, 116. When acting as a target DPA, a DPA may also enable rollback of data to an earlier point-in-time (PIT), and processing of rolled back data at the target site. Each DPA 112, 124 may be a physical device, a virtual device running, or may be a combination of a virtual and physical device.

In some embodiments, a DPA may be a cluster of such computers. In many embodiments, a cluster may ensure that if a DPA computer is down, then the DPA functionality switches over to another computer. In some embodiments, computers within a DPA cluster may communicate with one another using at least one communication link suitable for data transfer via fiber channel or IP based protocols, or such other transfer protocol. In certain embodiments, one computer from the DPA cluster may serve as the DPA leader that coordinates other computers in the cluster, and may also perform other tasks that require coordination between the computers, such as load balancing.

In certain embodiments, a DPA may be a standalone device integrated within a SAN. In other embodiments, a DPA may be integrated into a storage system. In some embodiments, the DPAs communicate with their respective hosts through communication lines such as fiber channels using, for example, SCSI commands or any other protocol.

In various embodiments, the DPAs may be configured to act as initiators in the SAN. For example, the DPAs may issue I/O requests using to access LUs on their respective storage systems. In some embodiments, each DPA may also be configured with the necessary functionality to act as targets, e.g., to reply to I/O requests, such as SCSI commands, issued by other initiators in the SAN, including their respective hosts. In certain embodiments, the DPAs, acting as target nodes, may dynamically expose or remove one or more LUs.

Referring again to FIG. 1, as described herein above, Site I and Site II may each behave simultaneously as a production site and a backup site for different logical units. As such, DPA 112 and DPA 124 may each behave as a source DPA for some LUs, and as a target DPA for other LUs, at the same time.

In the embodiment of FIG. 1, hosts 104 and 116 include protection agents 144 and 164, respectively. Protection agents 144 and 164 are configured to intercept SCSI commands issued by their respective hosts to LUs via host devices (e.g. host devices 140 and 160). A protection agent may act on an intercepted SCSI command issued to a logical unit, in one of the following ways: send the SCSI commands to its intended LU; redirect the SCSI command to another LU; split the SCSI command by sending it first to the respective DPA and, after the DPA returns an acknowledgement, send the SCSI command to its intended LU; fail a SCSI command by returning an error return code; and delay a SCSI command by not returning an acknowledgement to the respective host. A protection agent 144, 164 may handle different SCSI commands, differently, according to the type of the command. For example, a SCSI command inquiring about the size of a certain LU may be sent directly to that LU, whereas a SCSI write command may be split and sent first to a DPA within the host's site.

In various embodiments, a protection agent may change its behavior for handling SCSI commands, for example as a result of an instruction received from the DPA. In certain embodiments, the behavior of a protection agent for a certain host device may depend on the behavior of its associated DPA with respect to the LU of the host device. In some embodiments, when a DPA behaves as a source site DPA for a certain LU, then during normal course of operation, the associated protection agent may split I/O requests issued by a host to the host device corresponding to that LU. In particular embodiments, when a DPA behaves as a target device for a certain LU, then during normal course of operation, the associated protection agent fails I/O requests issued by the host to the host device corresponding to that LU.

Referring back to FIG. 1, communication between a protection agent 144, 164 and its respective DPA 112, 124 may use any protocol suitable for data transfer within a SAN, such as fiber channel, or SCSI over fiber channel. The communication may be direct, or via a logical unit exposed by the DPA.

In certain embodiments, protection agents may be drivers located in their respective hosts. In other embodiments, a protection agent may be located in a fiber channel switch or in any other device situated in a data path between a host and a storage system or on the storage system itself. In a virtualized environment, the protection agent may run at the hypervisor layer or in a virtual machine providing a virtualization layer.

Referring again to FIG. 1, the target storage system 120 exposes a journal LU 176 for maintaining a history of write transactions made to LU 156, referred to herein as a "journal." The journal may be used to provide access to storage at specified points in time, as discussed further below in conjunction with FIG. 2. In some embodiments, the journal may be stored across multiple LUs (e.g., using striping).

In the embodiment of FIG. 1, the target DPA 124 includes a journal processor 180 for managing the journal within LU 176. The journal processor 180 is configured to manage the journal entries of LU B 156. Specifically, journal processor 180 may enter write transactions received by the target DPA 124 from the source DPA 112 into the journal by writing them into the journal LU 176, read the undo information for the transaction from LU B 156, update the journal entries in the journal LU 176 with undo information, apply the journal transactions to LU B 156, and remove already-applied transactions from the journal.

In one embodiment, the journal processor 180 is configured to perform processing described in the patent titled "METHODS AND APPARATUS FOR OPTIMAL JOURNALING FOR CONTINUOUS DATA REPLICATION" and with U.S. Pat. No. 7,516,287, issued Apr. 7, 2009, which is hereby incorporated by reference.

Embodiments of the data replication system may be provided as physical systems for the replication of physical LUs, or as virtual systems for the replication of virtual LUs. In one embodiment, a hypervisor may consume LUs and may generate a distributed file system on the logical units such as VMFS, for example, generates files in the file system and exposes the files as LUs to the virtual machines (each virtual machine disk is seen as a SCSI device by virtual hosts). In another embodiment, a hypervisor may consume a network based file system and expose files in the NFS as SCSI devices to virtual hosts.

Referring back to FIG. 1, in normal operation (sometimes referred to as "production mode"), the DPA 112 acts as a source DPA for LU 136 ("LU A"). Thus, protection agent 144 is configured to act as a source protection agent, specifically by splitting I/O requests to host device 140 ("Device A"). The protection agent 144 may send an I/O request to source DPA 112 and, after receiving an acknowledgement therefrom, may send the I/O request to LU 136. After receiving a second acknowledgement from storage system 108, the host 104 may acknowledge that the I/O request has successfully completed.

When source DPA 112 receives a replicated I/O request from protection agent 144, source DPA 112 may transmit certain I/O information characterizing the write request, packaged as a "write transaction", over WAN 128 to the target DPA 124 for journaling and for incorporation within target storage system 120. When applying write operations to storage system 120, the target DPA 124 may act as an initiator, and may send SCSI commands to LU 156 ("LU B").

The source DPA 112 may send its write transactions to target DPA 124 using a variety of modes of transmission, including inter alia (i) a synchronous mode, (ii) an asynchronous mode, and (iii) a batch mode. In synchronous mode, the source DPA 112 may send each write transaction to the target DPA 124, may receive back an acknowledgement from the target DPA 124, and in turn may send an acknowledgement back to protection agent 144.

In synchronous mode, protection agent 144 may wait until receipt of such acknowledgement before sending the I/O request to LU 136. In asynchronous mode, the source DPA 112 may send an acknowledgement to protection agent 144 upon receipt of each I/O request, before receiving an acknowledgement back from target DPA 124.

In batch mode, the source DPA 112 may receive several I/O requests and combines them into an aggregate "batch" of write activity performed in the multiple I/O requests, and may send the batch to the target DPA 124, for journaling and for incorporation in target storage system 120. In batch mode, the source DPA 112 may send an acknowledgement to protection agent 144 upon receipt of each I/O request, before receiving an acknowledgement back from the target DPA 124.

As discussed above, in normal operation, LU B 156 may be used as a backup of LU A 136. As such, while data written to LU A by host 104 is replicated from LU A to LU B, the target host 116 should not send I/O requests to LU B. To prevent such I/O requests from being sent, protection agent 164 may act as a target side protection agent for host device B 160 and may fail I/O requests sent from host 116 to LU B 156 through host device B 160.

Still referring to FIG. 1, in recovery mode, the target DPA 124 may undo the write transactions in the journal LU 176 so as to restore the target storage system 120 to an earlier state.

In certain embodiments, the data protection system 100 utilizes structures and techniques described below in conjunction with FIGS. 3-6 to reduce resource utilization (e.g., network traffic) at the source side 100a.

Figure 2:
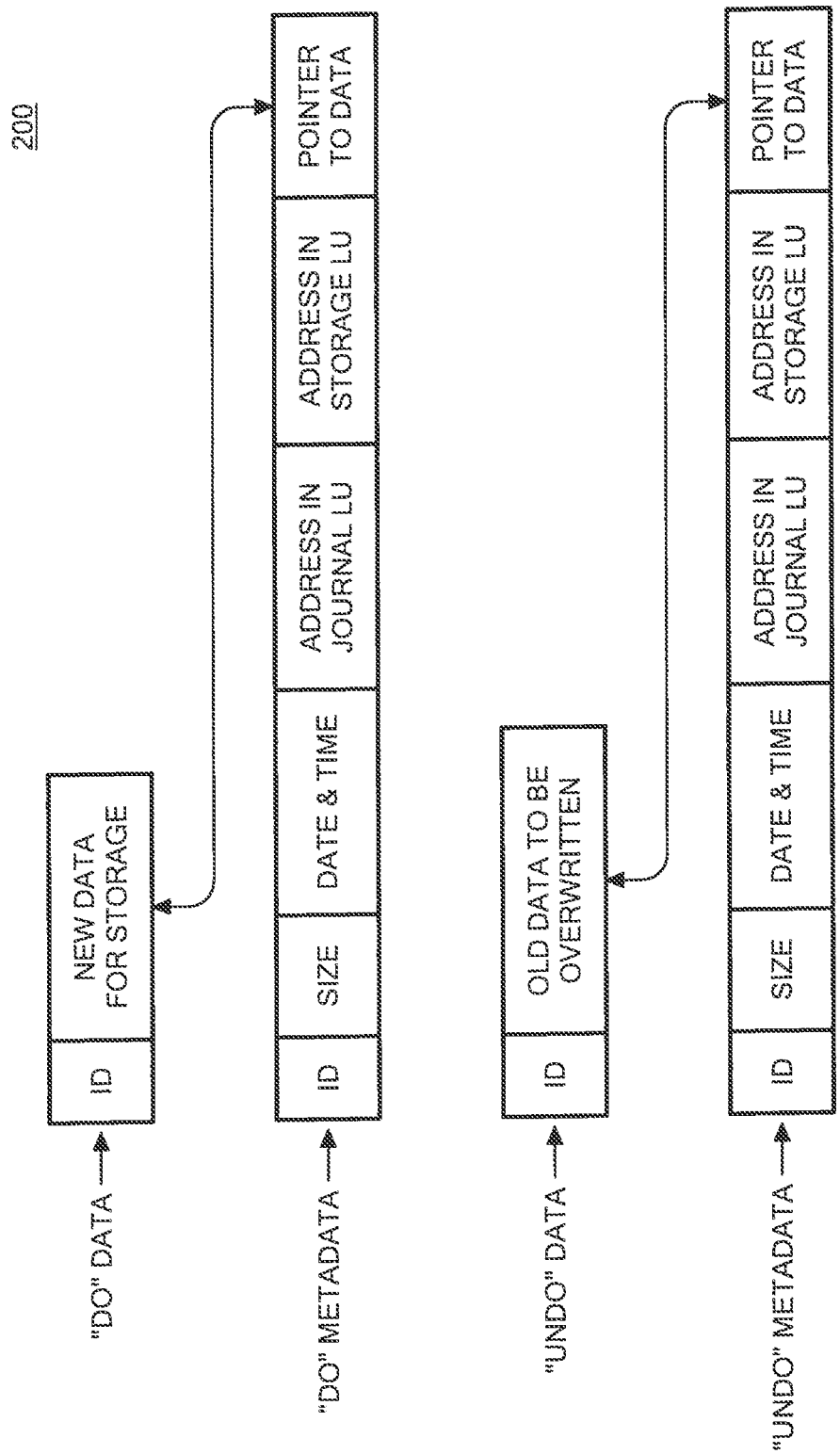
FIG. 2 is a diagram illustrating a journal history of write transactions for a storage system, according to one embodiment of the disclosure.

Referring to the embodiment of FIG. 2, a write transaction 200 may be included within a journal and stored within a journal LU, in accordance with an embodiment. The write transaction 200 includes one or more identifiers; a time stamp indicating the date and time at which the transaction was received by the source DPA; a write size indicating the size of the data block; a location in the journal LU where the data is entered; a location in the target LU where the data is to be written; and the data itself.

Referring briefly to both FIGS. 1 and 2, the transaction 200 may correspond to a transaction transmitted from the source DPA 112 to target DPA 124. The target DPA 124 may record the write transaction 200 in the journal that includes four streams. A first stream, referred to as a "DO" stream, includes a copy of the new data for writing to LU B 156. A second stream, referred to as a "DO METADATA" stream, includes metadata for the write transaction, such as an identifier, a date and time, a write size, the offset within LU B 156 where the new data is written, and a pointer to the offset in the DO stream where the corresponding data is located. A third stream, referred to as an "UNDO" stream, includes a copy of the data being overwritten within LU B 156 (referred to herein as the "old" data). A fourth stream, referred to as an "UNDO METADATA" stream, includes an identifier, a date and time, a write size, a beginning address in LU B 156 where data was (or will be) overwritten, and a pointer to the offset in the UNDO stream where the corresponding old data is located.

Since the journal contains the "undo" information necessary to rollback storage system 120, data that was stored in specific memory locations at a specified point in time may be obtained by undoing write transactions that occurred subsequent to such point in time.

Each of the four streams may hold a plurality of write transaction data. As write transactions are received dynamically by target DPA, the write transactions may be recorded at the end of the DO stream and the end of the DO METADATA stream, prior to committing the transaction.

In some embodiments, a metadata stream (e.g., UNDO METADATA stream or the DO METADATA stream) and the corresponding data stream (e.g., UNDO stream or DO stream) may be kept in a single stream by interleaving metadata and data.

Figure 3:
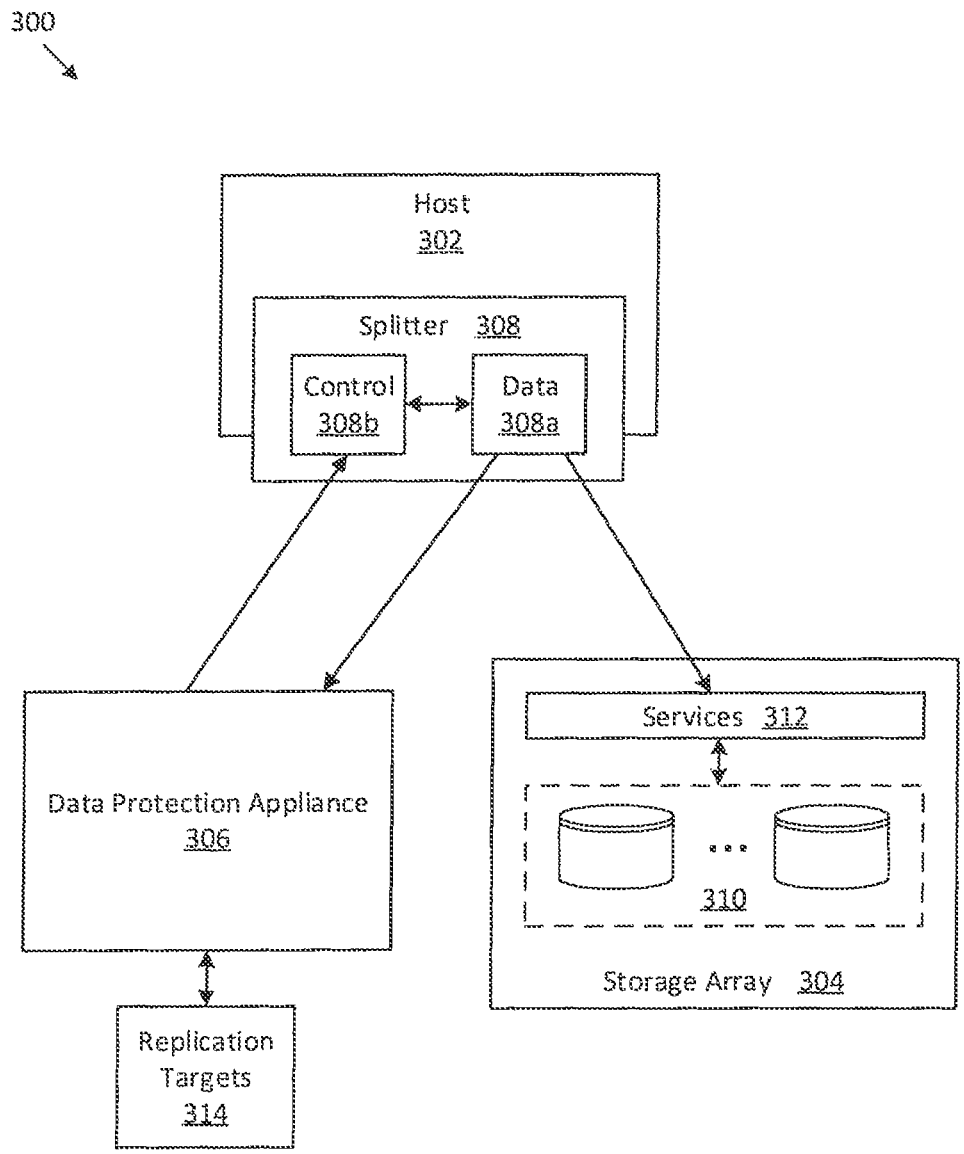
FIG. 3 is a block diagram of a data protection system, according to another embodiment of the disclosure.

Referring to FIG. 3, a data protection system 300 includes a host 302, a storage array 304, and a data protection appliance (DPA) 306, according to an embodiment of the disclosure. The DPA 306 may be configured to replicate data written by the host 302 to one or more replication targets 314. In some embodiments, a replication target 314 may include a remote storage system to which host 302 data is continuously replicated. In particular embodiments, replication targets 314 may include snapshot storage.

The storage array 304 may include one or more storage devices 310 and storage services 312 configured to manage data stored therein. In some embodiments, the storage services 312 are configured to receive I/Os from the host 302, the splitter 308, or other data source.

The splitter 308 is a component configured to perform various tasks related to data replication. In the embodiment shown, the splitter 308 includes a data module 308a and a control module 308b. The data module 308a is configured to intercept I/Os targeted at the storage array 304 and to send copies of I/Os (i.e., to "mirror" the I/Os) to the DPA 306 for processing and replication. The control module 308b may be configured to maintain metadata that can be used by the DPA 306 to recover from certain replication errors. In certain embodiments, the control module 308b maintains a backlog of I/Os that were processed by the splitter 308 and sent to the DPA 306 for replication. For example, if the DPA 306 successfully receives an I/O write from the splitter 308 but subsequently loses the I/O write (e.g., due to data corruption within the DPA or a failure of the DPA), the DPA 306, as part of its recovery, can send a request to the control module 308b to have the splitter 308 resend the I/O write using the backlog.

In some embodiments, the splitter 308 may run on the host 302. In particular embodiments, where the host 302 includes a hypervisor and one or more virtual machines (VMs) running thereon, the splitter 308 may be configured to run within the hypervisor. It is appreciated that locating the splitter within the hypervisor provides it necessary context in terms of I/O affiliation to specific VMs and additional metadata. In other embodiments, the splitter 308 may be separate from the host 302.

Figure 4:
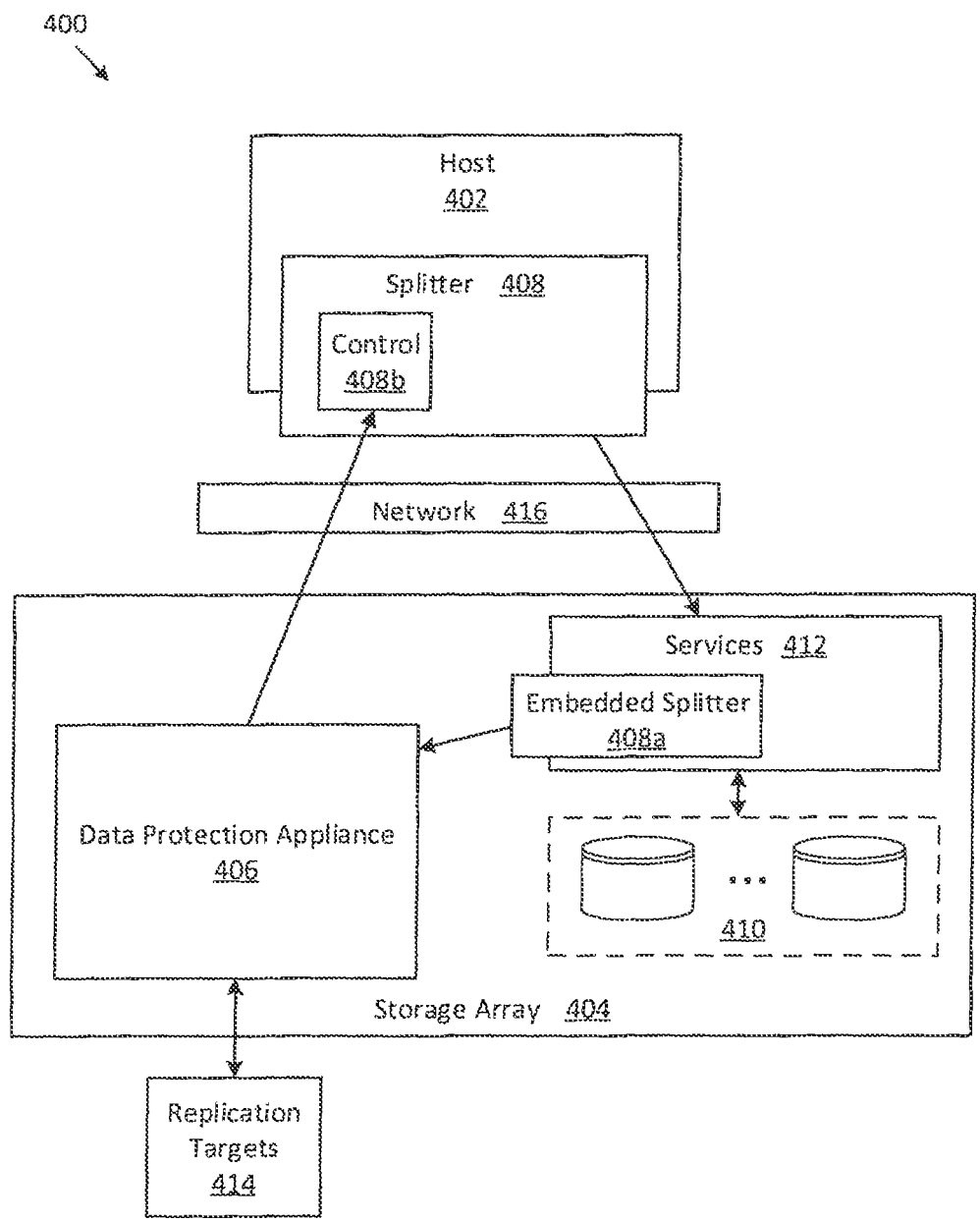
FIG. 4 is a block diagram of a data protection system, according to yet another embodiment of the disclosure.

Referring to FIG. 4, according to some embodiments, a data protection system 400 includes a host 402, a storage array 404 having storage devices 410 and services 412, and a data protection appliance (DPA) 406 configured to replicate host data to one or more replication targets 414. The host 402 may be coupled to the storage array 404 via a network 416. In some embodiments, the network 416 may be a storage-area network (SAN).

As shown, the data protection appliance (DPA) may be located within the storage array 404. In some embodiments, the storage array 404 may include a so-called "friendly-zone" where services can execute in a safe and privileged manner while having direct access to data stored on the array (e.g., in storage devices 410) using high-speed, low-latency protocols such as remote direct memory access (RDMA).

It is appreciated herein that performing the data splitting operations at the host 402 (i.e., using a host-side module 302 as described above in conjunction with FIG. 3) may be inefficient because it would result in each I/O being sent twice over the network 416 to the storage array 404: once to write to target storage 410 and again to send to the embedded DPA 406. Accordingly, in the embodiment of FIG. 4, data splitting may occur within the storage array 404 using an embedded splitter 408a.

The embedded splitter 408a may be configured to duplicate I/O writes within the storage array 404 and to send writes to both target storage 410 and the DPA 406. In some embodiments, when sending I/Os to the DPA 406, the embedded splitter 408a can use a lower timeout value compared to the data module 308a of FIG. 3.

In many embodiments, the control operations of the splitter 408 may remain within the host 402. Thus, the data protection system 400 may be said to use a "dual-splitter" configuration. A host-side splitter control module 408b may be configured to track I/Os from the host 402 to the storage array 404 and maintain metadata that can be used by the DPA 406 for error recovery. In some embodiments, the DPA 406 may send requests to the control module 408b. For example, the DPA 406 may request that the backlog be cleared after I/Os are successfully replicated to replication targets 414. As another example, the DPA 406 may request backlog information from the control module 408b for the purpose of recovering from a replication error.

In addition to improving system performance, it is appreciated that the structures and techniques described herein can decrease complexity at the host 402 (i.e., within host-side splitter 408) and improve overall system stability.

In some embodiments, using an embedded splitter 408a may reduce host I/O latency introduced by replication compared to existing techniques. In certain embodiments, the embedded splitter 408a is an integral component of the storage array 404, which mirrors incoming host data into both the array disks and the DPA. In many embodiments, the embedded splitter component may communicate with the DPA using a low-latency method—such as RDMA (remote direct memory access) which may be used in existing storage arrays—to further reduce host I/O latency. In some embodiments, locating the DPA within the "friendly zone" of the storage array may permit such low-latency communication between the embedded splitter component and the DPA.

Figure 5:
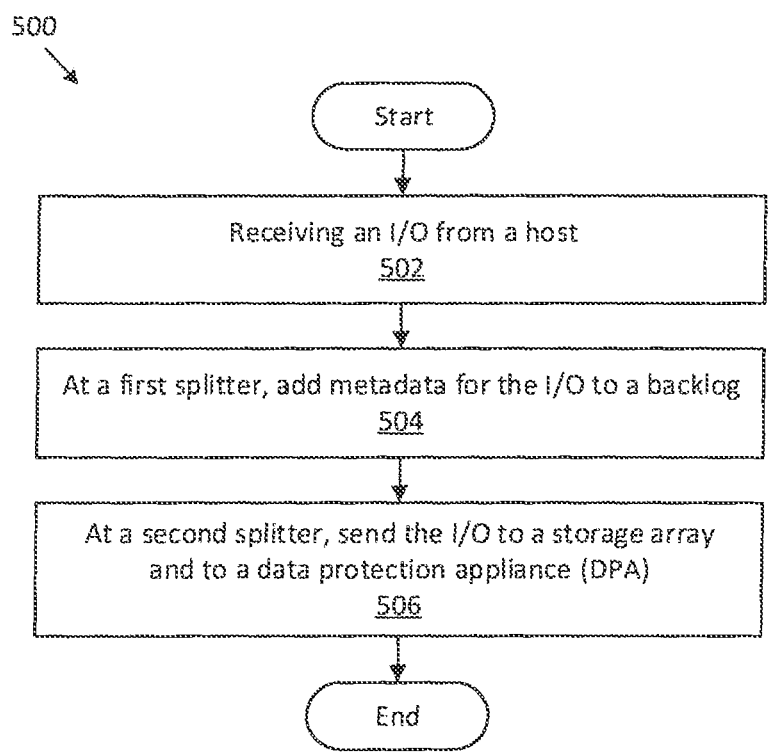
FIGS. 5 and 6 are flow diagrams illustrating processing that may occur within a data protection system, accordance to an embodiment.

FIG. 5 is a flow diagram showing illustrative processing that can be implemented within data protection system (e.g., data protection systems 100, 300, or 400 of FIG. 1, 3, or 4, respectively). Rectangular elements (typified by element 502), herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Referring to FIG. 5, a method 500 begins at block 502, where an I/O request (e.g., an I/O write request) is received from a host. At block 504, metadata about the I/O may be added to a backlog at a first splitter. In some embodiments, the first splitter is located at the host. In particular embodiments, the first splitter is located within a hypervisor and receiving the I/O from the host includes receiving the I/O from a virtual machine (VM) running on the hypervisor.

At block 506, a second splitter may send (or "mirror") the I/O to both a storage array and to a data protection appliance (DPA). In various embodiments, the second splitter and the DPA are located within the storage array. In certain embodiments, the average latency between the second splitter and the DPA may be less than 10 microseconds.

Figure 6:
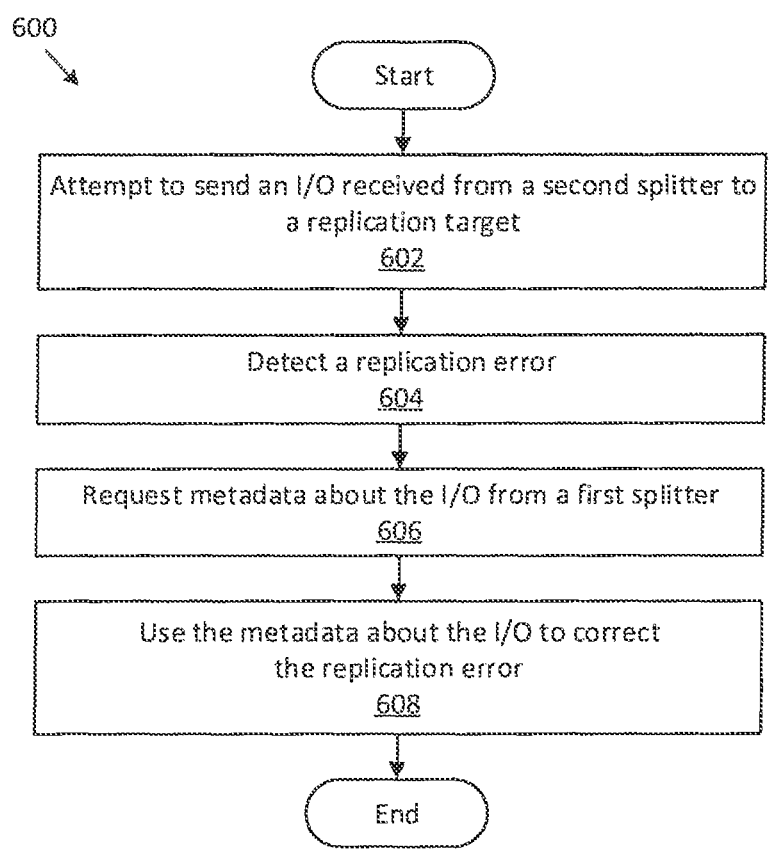

Referring to FIG. 6, a method 600 begins at block 602, where an attempt is made to send an I/O, received from a second splitter, to a replication target. In certain embodiments, the replication target may include a remote storage system to which host data is continuously replicated. In particular embodiments, the replication target may include snapshot storage.

At block 604, a replication error is detected in response to the attempt. At block 606, a request for metadata about the I/O is sent to a first splitter. In some embodiments, the first splitter uses metadata within a backlog to respond to the request. At block 608, the requested metadata is used to correct the replication error (i.e., to re-attempt sending the I/O to the replication target).

In some embodiments, the processing of blocks 602-608 may be performed at a data protection appliance (DPA). In some embodiments, the DPA and the second splitter are located within a storage array. In some embodiments, the first splitter is located at a host. In particular embodiments, the first splitter is located within a hypervisor at the host.

Figure 7:
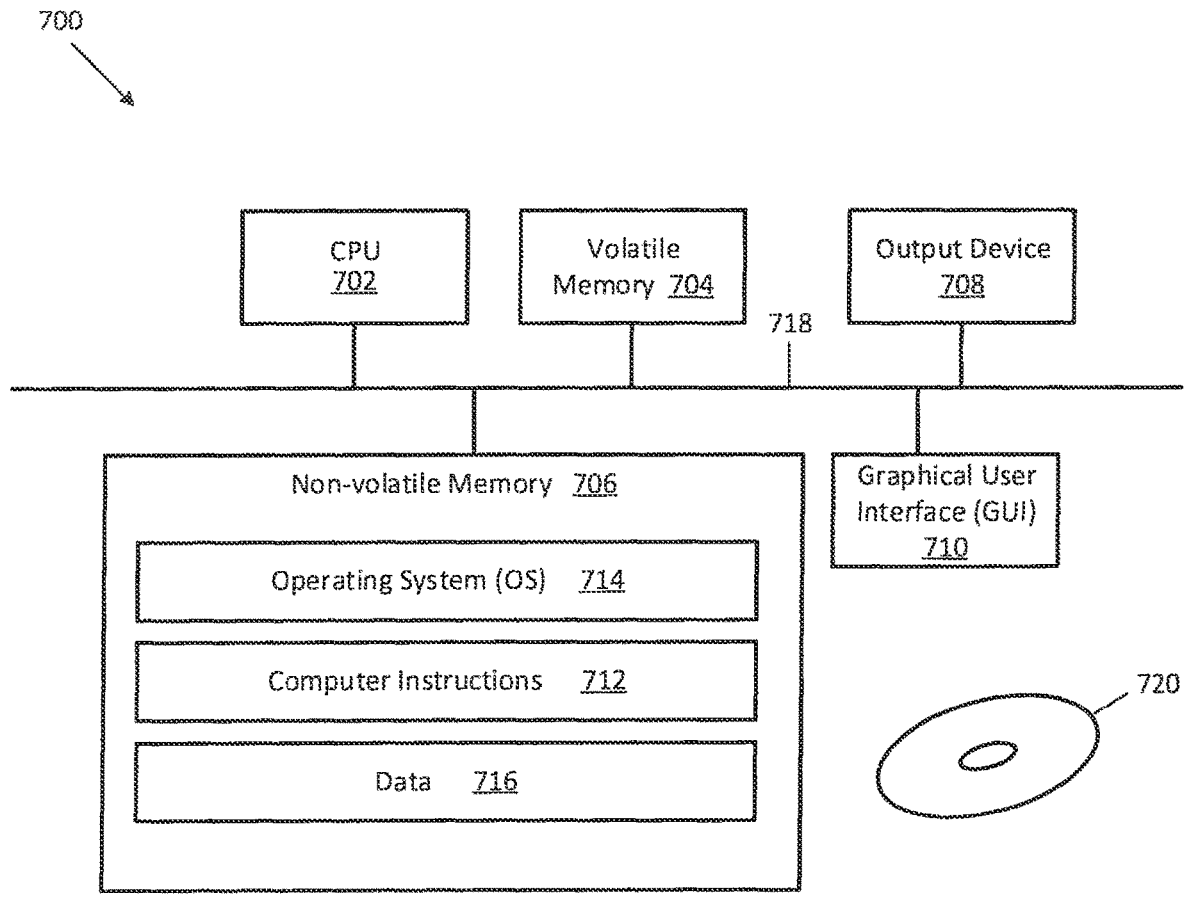
FIG. 7 is a block diagram of a computer on which the processing of FIGS. 5 and 6 may be implemented, according to an embodiment of the disclosure.

FIG. 7 shows a computer 700 that can perform at least part of the processing described herein, according to one embodiment. The computer 700 may include a processor 702, a volatile memory 704, a non-volatile memory 706 (e.g., hard disk), an output device 708 and a graphical user interface (GUI) 710 (e.g., a mouse, a keyboard, a display, for example), each of which is coupled together by a bus 718. The non-volatile memory 706 may be configured to store computer instructions 712, an operating system 714, and data 716. In one example, the computer instructions 712 are executed by the processor 702 out of volatile memory 704. In some embodiments, the computer 700 corresponds to a virtual machine (VM). In other embodiments, the computer 700 corresponds to a physical computer.

In some embodiments, a non-transitory computer readable medium 720 may be provided on which a computer program product may be tangibly embodied. The non-transitory computer-readable medium 720 may store program instructions that are executable to perform the processing of FIGS. 5 and 6

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A method for performing dual splitting functions in a data replication system, the method comprising:
  receiving an I/O from a host computer, the host computer including a first splitter configured to perform control path functions;
  adding, via the first splitter, metadata for the I/O to a backlog at the host computer;

sending the I/O to a storage array, the storage array including a second splitter configured to perform data path functions;
receiving, by the storage array, the I/O from the host computer; and
sending, via the second splitter, the I/O to at least one storage device of the storage array and to a data protection appliance (DPA);
wherein the control path functions include tracking I/Os and maintaining backlogs including the backlog at the host computer, and the data path functions include mirroring operations in the storage array.

2. The method of claim 1, wherein the first splitter is located at the host computer.

3. The method of claim 1, wherein the first splitter is located within a hypervisor at the host computer.

4. The method of claim 1, wherein the DPA and the second splitter are located within the storage array.

5. The method of claim 1, further comprising:
attempting, at the DPA, to send the I/O to a replication target;
detecting, at the DPA, a replication error in response to the attempt;
requesting, at the DPA, metadata about the I/O from the first splitter; and
using, at the DPA, the requested metadata to correct the replication error.

6. The method of claim 5, wherein attempting to send the I/O to the replication target includes attempting to send the I/O to a remote storage system to which host computer data is continuously replicated.

7. The method of claim 5, wherein attempting to send the I/O to the replication target includes attempting to send the I/O to snapshot storage.

8. A computer program product embodied on a non-transitory computer readable medium, the computer program product including instructions that, when executed by a computer system, causes the computer system to perform operations comprising:
receiving an I/O from a host computer, the host computer including a first splitter configured to perform control path functions;
adding, via the first splitter, metadata for the I/O to a backlog at the host computer;
sending the I/O to a storage array, the storage array including a second splitter configured to perform data path functions;
receiving, by the storage array, the I/O from the host computer; and
sending, via the second splitter, the I/O to at least one storage device of the storage array and to a data protection appliance (DPA);
wherein the control path functions include tracking I/Os and maintaining backlogs including the backlog at the host computer, and the data path functions include mirroring operations in the storage array.

9. The computer program product of claim 8, wherein the first splitter is located at the host computer.

10. The computer program product of claim 8, wherein the first splitter is located within a hypervisor at the host computer.

11. The computer program product of claim 8, wherein the DPA and the second splitter are located within the storage array.

12. The computer program product of claim 8, wherein the operations further comprise:
attempting, at the DPA, to send the I/O to a replication target;
detecting, at the DPA, a replication error in response to the attempt;
requesting, at the DPA, metadata about the I/O from the first splitter; and
using, at the DPA, the requested metadata to correct the replication error.

13. The computer program product of claim 12, wherein attempting to send the I/O to the replication target includes attempting to send the I/O to a remote storage system to which host computer data is continuously replicated.

14. The computer program product of claim 12, wherein attempting to send the I/O to the replication target includes attempting to send the I/O to snapshot storage.

* * * * *